US008391831B2

(12) United States Patent
Murakami et al.

(10) Patent No.: US 8,391,831 B2
(45) Date of Patent: Mar. 5, 2013

(54) IN-VEHICLE TERMINAL FOR EMERGENCY NOTIFICATION

(75) Inventors: Naoki Murakami, Nishio (JP); Koichi Masuda, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/096,499

(22) Filed: Apr. 28, 2011

(65) Prior Publication Data

US 2011/0281545 A1 Nov. 17, 2011

(30) Foreign Application Priority Data

May 11, 2010 (JP) ................................ 2010-109227

(51) Int. Cl.
*H04M 11/04* (2006.01)
*H04M 1/00* (2006.01)
*H04B 1/38* (2006.01)
*H04B 7/00* (2006.01)

(52) U.S. Cl. .................... 455/404.1; 455/574; 455/572; 455/521; 455/550

(58) Field of Classification Search .................. 455/574, 455/404.1, 572, 521, 456.5, 411; 340/539.18
See application file for complete search history.

(56) References Cited

U.S. PATENT DOCUMENTS

| | | | | |
|---|---|---|---|---|
| 7,274,924 | B2 | 9/2007 | Yoshioka | |
| 7,631,215 | B2 | 12/2009 | Ikehara et al. | |
| 7,724,128 | B2 | 5/2010 | Shimizu | |
| 2005/0070250 | A1* | 3/2005 | Scalisi et al. | 455/411 |
| 2005/0200479 | A1* | 9/2005 | James | 340/539.18 |
| 2007/0224941 | A1 | 9/2007 | Yoshioka | |
| 2008/0051057 | A1* | 2/2008 | Bliss | 455/404.1 |
| 2009/0209225 | A1 | 8/2009 | Sakai et al. | |
| 2010/0323657 | A1* | 12/2010 | Barnard et al. | 455/404.1 |

FOREIGN PATENT DOCUMENTS

| | | |
|---|---|---|
| JP | A-2000-278885 | 10/2000 |
| JP | A-2002-152419 | 5/2002 |
| JP | A-2002-279567 | 9/2002 |
| JP | A-2004-013388 | 1/2004 |
| JP | A-2005-323285 | 11/2005 |
| JP | A-2007-079950 | 3/2007 |
| JP | A-2007-108884 | 4/2007 |
| JP | A-2007-183865 | 7/2007 |

OTHER PUBLICATIONS

Office Action mailed Jul. 17, 2012 in corresponding JP Application No. 2010-109227 (and English translation).

* cited by examiner

*Primary Examiner* — Kent Chang
*Assistant Examiner* — Kuo Woo
(74) *Attorney, Agent, or Firm* — Posz Law Group, PLC

(57) ABSTRACT

An emergency notification in-vehicle terminal mountable to a vehicle is disclosed. The in-vehicle terminal is configured to transmit emergency information to a center in response to detection of an occurrence of an emergency situation involving the vehicle. The in-vehicle terminal determines, in response to the detection of the occurrence of the emergency situation, whether the emergency notification in-vehicle terminal is operating by an electric power of a back-up battery. If it is determined that the emergency notification in-vehicle terminal is operating by the electric power of the back-up battery, the in-vehicle terminal transmits a minimum necessary amount of the emergency information to the center.

9 Claims, 6 Drawing Sheets

IN-VEHICLE TERMINAL FOR EMERGENCY NOTIFICATION

CROSS REFERENCE TO RELATED APPLICATION

The present application is based on and claims priority to Japanese Patent Application No. 2010-109227 filed on May 11, 2010, disclosure of which is incorporated herein by reference.

BACKGROUND

1. Technical Field

The present disclosure relates to an in-vehicle terminal for emergency notification, which is configured to transmit emergency information to a center in response to detection of an occurrence of an emergency situation involving a vehicle.

2. Description of Related Art

Under normal circumstances, an in-vehicle terminal for emergency notification (called also an emergency notification in-vehicle terminal) receives an electric power from a vehicle battery. The emergency notification in-vehicle terminal includes a dedicated back-up battery in order to send an emergency notification even in cases where a connection wire, which connects the in-vehicle terminal to the vehicle battery, is disconnected or a fuse is melted and cut. This kind of emergency notification in-vehicle terminal transmits emergency information to an emergency call center when an emergency situation such as a vehicle collision and the like is detected. The emergency information typically includes the time of occurrence of the emergency situation, a vehicle position, a vehicular swept path, a vehicle speed, a vehicle direction, an ID of the emergency notification in-vehicle terminal, a phone number of the emergency notification in-vehicle terminal and the like. When an operator of the emergency call center receives the above emergency information from the emergency notification in-vehicle terminal, the operator calls back the phone number of the emergency notification in-vehicle terminal and conducts a telephone communication with the driver of the vehicle to confirm the safety of the driver. A mobile communication device configured to reduce electric power consumption is described in Patent Document 1.

Patent Document 1: JP-2005-323285A

In the above configuration, the emergency notification in-vehicle terminal consumes a large amount of electric power in conducting the telephone communication with the emergency call center. Thus, the back-up battery, which is built in the emergency notification in-vehicle terminal, needs to have a considerably-large battery capacity.

SUMMARY

In view of the above, it is an objective of the present disclosure to provide an emergency notification in-vehicle terminal that can use a small capacity battery as its back-up battery.

According to an aspect of the present disclosure, an emergency notification in-vehicle terminal mountable to a vehicle is provided. The emergency notification in-vehicle terminal is configured to transmit emergency information to a center in response to detection of an occurrence of an emergency situation involving the vehicle. The emergency notification in-vehicle terminal determines, in response to the detection of the occurrence of the emergency situation, whether the emergency notification in-vehicle terminal is operating by an electric power of a back-up battery. When it is determined that the emergency notification in-vehicle terminal is operating by the electric power of the back-up battery, the emergency notification in-vehicle terminal transmits a minimum necessary amount of the emergency information to the center.

According to the above, since the emergency notification in-vehicle terminal transmits the minimum necessary amount of the emergency information to the center when operating by the electric power of the back-up battery, it is possible to decrease an amount of electric power consumption of the emergency notification in-vehicle terminal, and thus, a small capacity battery can be used as the back-up battery.

BRIEF DESCRIPTION OF THE DRAWINGS

The above and other objects, features and advantages relating to the present invention will become more apparent from the following detailed description made with reference to the accompanying drawings. In the drawings.

DETAILED DESCRIPTION OF EMBODIMENTS

Figure 1:
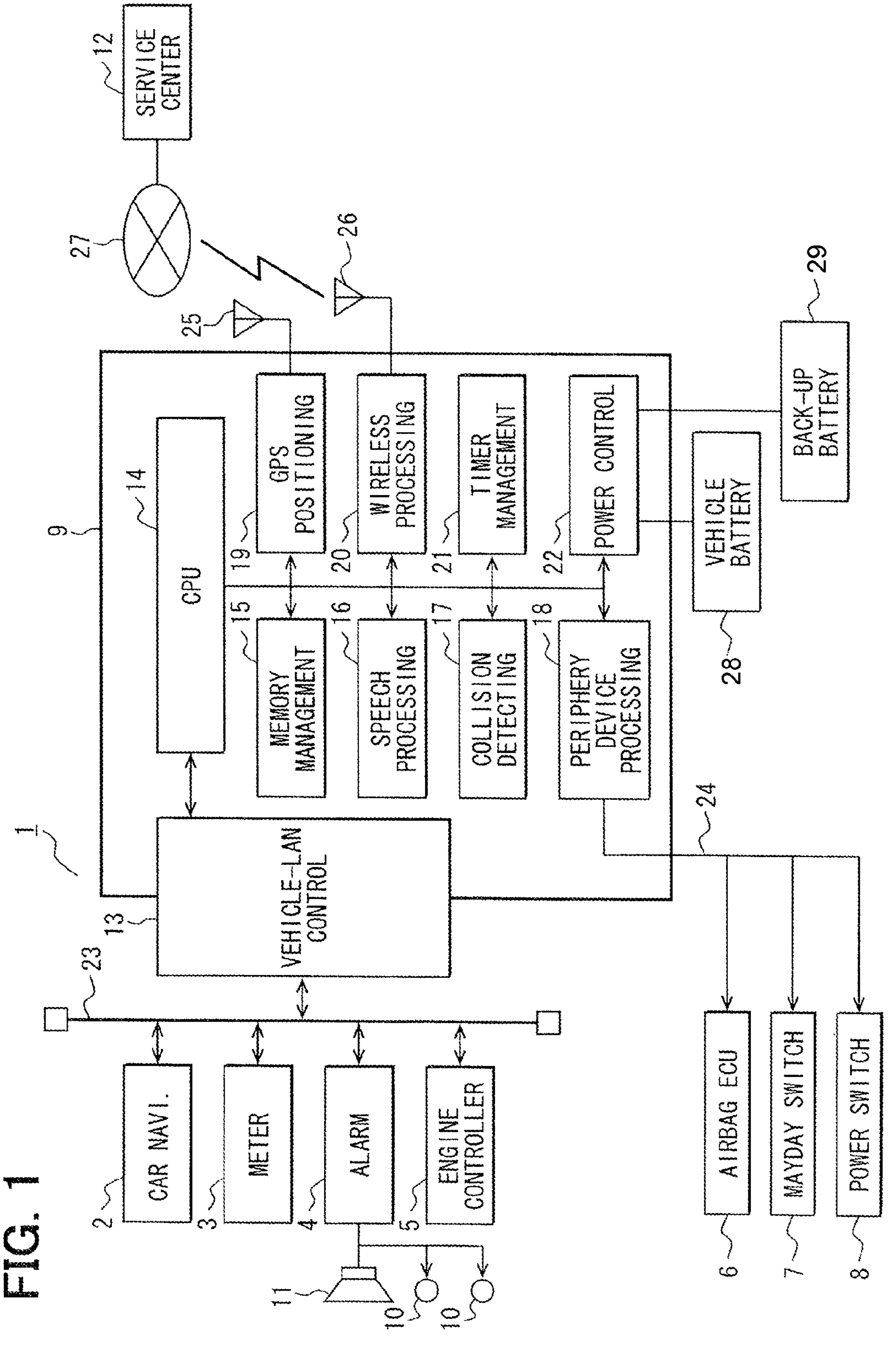
FIG. 1 is a block diagram illustrating an emergency notification system according to one embodiment.

An emergency notification system mounted to a vehicle will be described with reference to FIGS. 1 to 7. FIG. 1 is a block diagram illustrating an electric configuration of an emergency notification system 1 for a vehicle of one embodiment. As shown in FIG. 1, the emergency notification system 1 includes a car navigation apparatus 2, a meter apparatus 3, an alarm apparatus 4, an engine control apparatus 5, an airbag ECU (electronic control unit) 6, a mayday switch 7, a power switch 8, and an emergency notification in-vehicle terminal 9.

The car navigation apparatus 2 can have a known configuration. The meter apparatus 3 includes, for example, a speedometer and a tachometer etc. of the vehicle. The alarm apparatus 4 receives detection signals from various sensors 10 for detecting a vehicle theft. In response to detection of the vehicle theft etc., the alarm apparatus 4 drives and sounds a horn 11 of the vehicle and generates a signal that causes the emergency notification in-vehicle terminal 9 to notify an emergency situation to a vehicle service center 12. The engine control apparatus 5 includes an ECU configured to control an engine of the vehicle.

The airbag ECU 6 has various control functions. For example, the airbag ECU 6 detects a vehicle collision and activates an airbag. The mayday switch 7 is manipulatable by a vehicle driver in case of emergency situations. For example, when the mayday switch 7 is pressed due to sudden illness, the mayday switch 7 generates a signal that causes the emergency notification in-vehicle terminal 9 to notify an emergency situation to the vehicle service center 12. The power switch 8 includes a switch for starting various apparatuses of the vehicle such as an engine and the like. The power switch 8 generates an ACC (accessory) signal, an ignition signal or the like.

The emergency notification in-vehicle terminal 9 includes an in-vehicle LAN control part 13, a CPU 14, a memory management part 15, a speech processing part 16, a collision detection part 17, a peripheral device processing part 18, a GPS positioning part 19, a wireless processing part 20, a timer management part 21, and a power control part 22. Via an in-vehicle LAN 23, the vehicle LAN control part 13 transmits a data (signal) to various in-vehicle apparatus such as the car navigation apparatus 2, the meter apparatus 3, the alarm apparatus 4 and the engine control apparatus 5. The vehicle LAN control part 13 receives a data (signal) from the in-vehicle apparatus via the in-vehicle LAN 23.

The CPU 14 controls generally all of operations of the emergency notification in-vehicle terminal 9. The CPU 14 can correspond to a determination means or a determination portion and a transmission means or a transmission portion. The memory management part 15 has a function to temporarily store a data. The memory management part 15 can correspond to a memory means or portion. The speech processing part 16 decodes a digitized speech signal, and encodes a speech signal. The collision detection part 17 receives a signal from the airbag ECU 6 and detects that the airbag has been activated. The peripheral device processing part 18 transmits a signal (data) to various in-vehicle apparatus (e.g., the airbag ECU 6, the mayday switch 7, the power switch 8 and the like) and receives a signal (data) from the various in-vehicle apparatus via a wiring harness 24.

The GPS positioning part 19 receives a GPS signal via an antenna 25 to detect present position. The wireless processing part 20 wirelessly communicates with the vehicle service center 12 via an antenna 26 and a network 27 (e.g., cellular phone communication network). The wireless processing part 20 can further wirelessly communicates with a cellular phone, which may be carried into a vehicle compartment by a driver, via a Bluetooth connection link for example. The timer management part 21 performs time measurement when a data is acquired or outputted at predetermined time intervals. The power control part 22 receives an electric power from a vehicle battery 28 mounted to a vehicle or a back-up battery, and generates an electric power to be supplied to components of the emergency notification in-vehicle terminal 9.

The back-up battery 29 supplies the electric power to the emergency notification in-vehicle terminal 9 when, for example, the wire connecting the emergency notification in-vehicle terminal 9 to the vehicle battery 28 etc. is disconnected due to an emergency situation such as the vehicle collision; as a results, the vehicle battery 28 is not able to supply the electric power to the emergency notification in-vehicle terminal 9. The back-up battery 29 is, for example, built in the emergency notification in-vehicle terminal 9. Alternatively, the back-up battery 29 may not be built in the emergency notification in-vehicle terminal 9. The back-up battery 29 may be dedicated to the emergency notification in-vehicle terminal 9.

The network 27 includes a wireless communication network for cell-phone, Internet, and the like. The vehicle service center 12 has a resident operator. When the operator receives the emergency information indicating an accident, a sudden illness or the like, the operator conducts a telephone communication with a driver of the vehicle via the emergency notification in-vehicle terminal 9 or the cellular phone of the driver. Then the operator in the vehicle service center 12 provides an emergency notification service through informing the police, the fire dept., the hospital etc. of the occurrence of the emergency situation.

Figure 2:
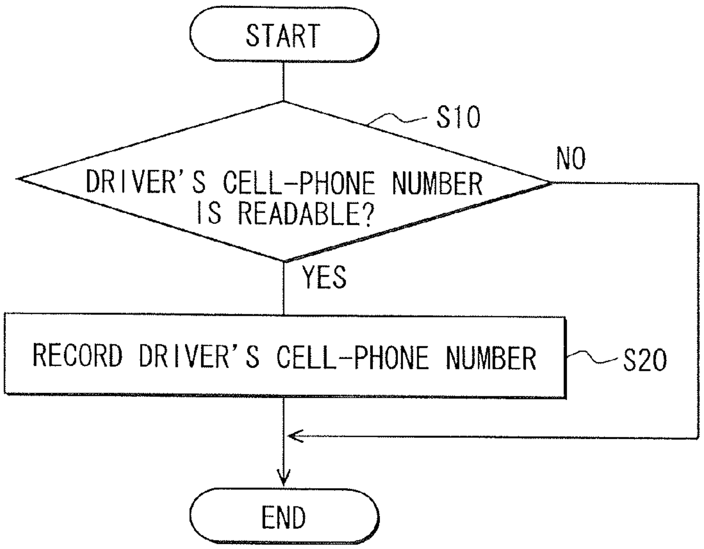
FIG. 2 is a flowchart illustrating a control operation performed by an emergency notification in-vehicle terminal to acquire a driver's cell-phone number.
Figure 3:
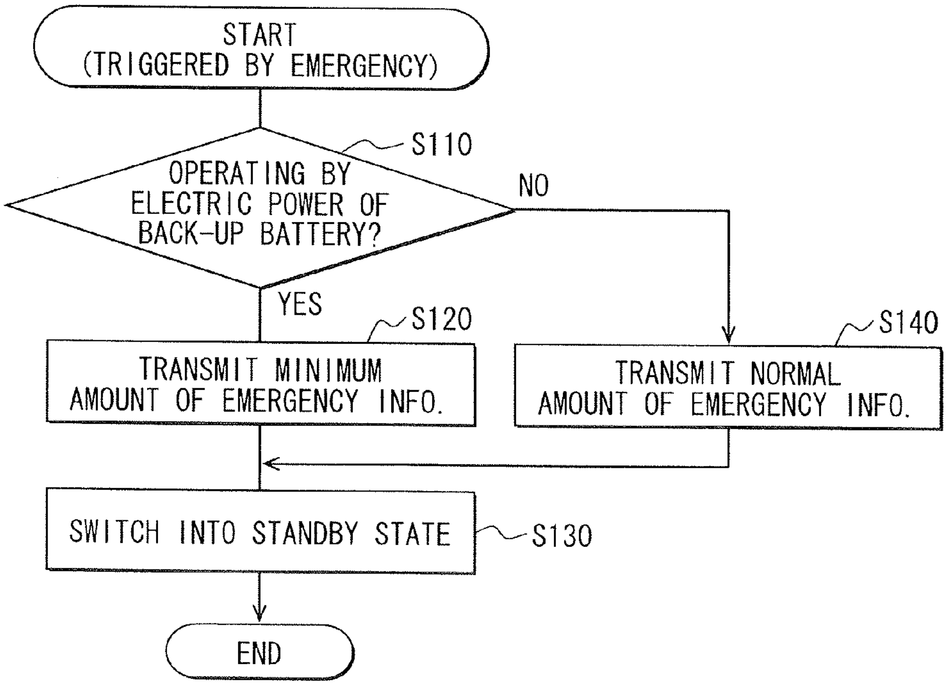
FIG. 3 is a flowchart illustrating a control operation performed by an emergency notification in-vehicle terminal when the emergency notification in-vehicle terminal is operating by an electric power of a back-up battery.
Figure 4:
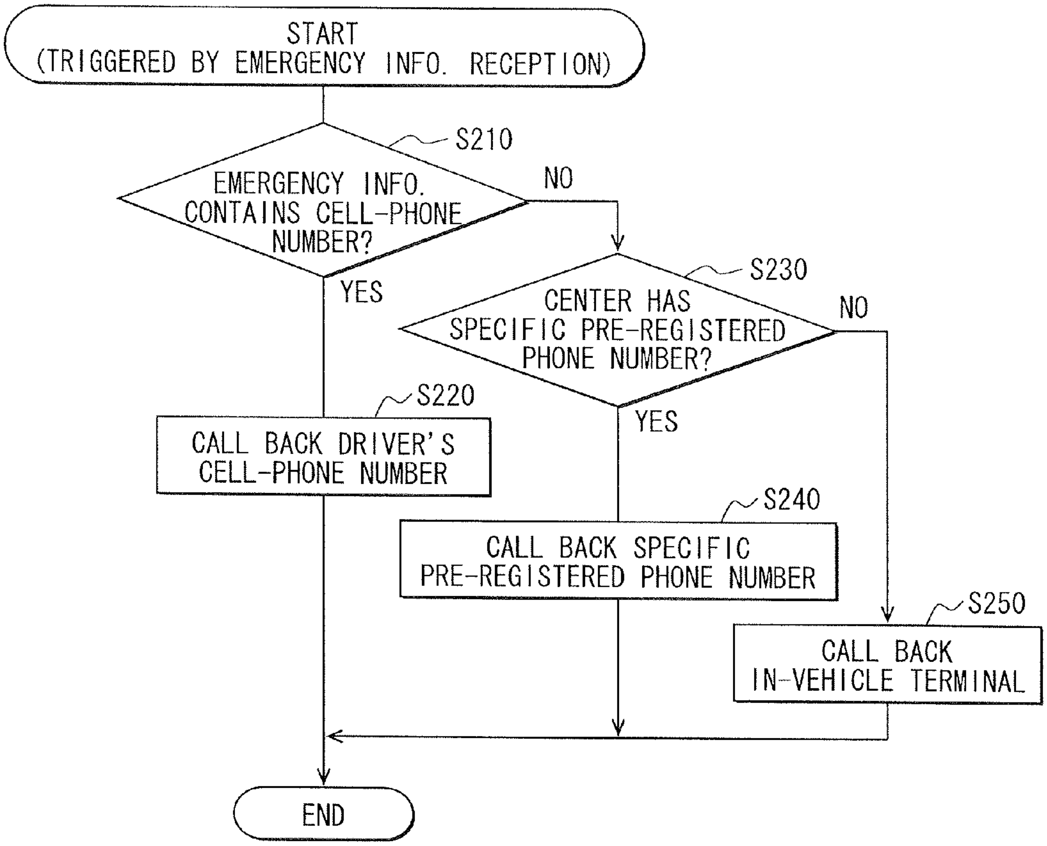
FIG. 4 is a flowchart illustrating an operation performed by a vehicle service center.
Figure 5:
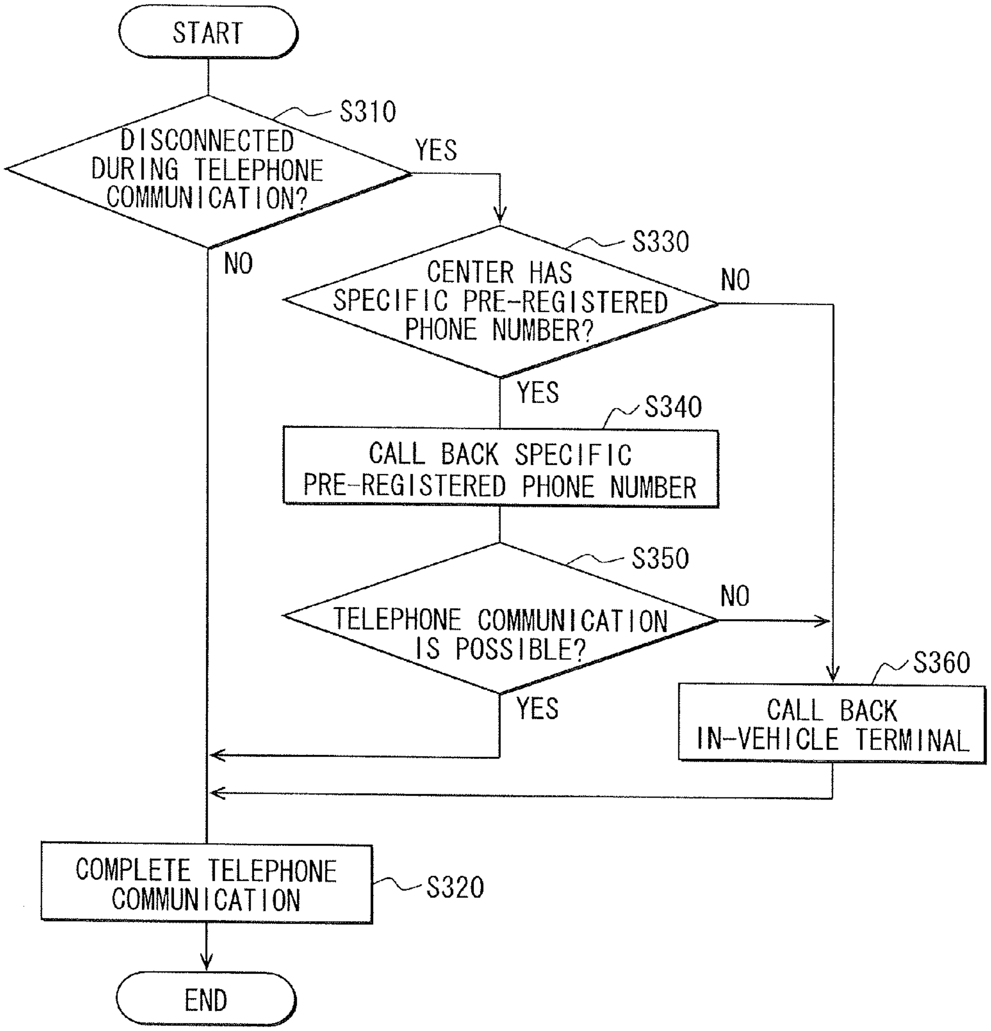
FIG. 5 is a flowchart illustrating an operation performed by a vehicle service center in a case of telephone communication error.

Operations of the emergency notification in-vehicle terminal 9 and the vehicle service center 12 will be described. FIGS. 2 and 3 are flowcharts illustrating a control operation of the emergency notification in-vehicle terminal 9. FIGS. 4 and 5 are flowcharts illustrating a control operation of the vehicle service center 12 with the operator.

When the power switch 8 (e.g., ACC switch) is turned on, the emergency notification in-vehicle terminal 9 starts performing a control operation illustrated in FIG. 2.

At S10, the emergency notification in-vehicle terminal 9 determines whether a phone number of a cellular phone of a driver, which is carried into a vehicle compartment, is readable. In making the above determination, the emergency notification in-vehicle terminal 9 performs, for example, the followings. The emergency notification in-vehicle terminal 9 requests the car navigation apparatus 2 to read out the phone number of the cellular phone of the driver. Then, the car navigation apparatus 2 performs wireless communications with the cellular phone of the driver via, for example, a Bluetooth connection, reads out the phone number of the cellular phone of the driver, and transmits the read-out phone number to the emergency notification in-vehicle terminal 9. When the car navigation apparatus 2 is not able to read out the phone number of the cellular phone of the driver successfully, the car navigation apparatus 2 informs the emergency notification in-vehicle terminal 9 that the car navigation apparatus 2 is not able to read out the phone number of the cellular phone of the driver.

When it is determined that the phone number of the cellular phone of the driver is readable, corresponding to "YES" at S10, the process proceeds to S20. At S20, the emergency notification in-vehicle terminal 9 reads out and records the phone number of the cellular phone of the driver. When it is determined that the phone number of the cellular phone is unreadable, corresponding to "NO" at S10, the control operation in FIG. 1 may be ended. In the case of "NO" at S10, the emergency notification in-vehicle terminal 9 may repeatedly perform the control operation in FIG. 1 at given time intervals during an on state of the power switch 8. For example, the process may return to S10 after a lapse of a predetermined period from "NO" at S10, and it may be again determined whether the phone number of the cellular phone of the driver is readable.

Then, if an emergency situation such as a collision and the like occurs, the emergency notification in-vehicle terminal 9 performs a control operation illustrated in FIG. 3. At S110, the emergency notification in-vehicle terminal 9 determines whether the emergency notification in-vehicle terminal 9 is using the electric power supplied from the back-up battery 29. In other words, the emergency notification in-vehicle terminal 9 determines whether the emergency notification in-vehicle terminal 9 is operating by the electric power of the back-up battery 29. When it is determined that the emergency notification in-vehicle terminal 9 is using the electric power supplied from the back-up battery 29, i.e., when it is determined that the emergency notification in-vehicle terminal 9 is operating by the electric power of the back-up battery 29, the determination "YES" is made at S110. In this case, the process proceeds to S120. At S120, the emergency notification in-vehicle terminal 9 transmits a minimum necessary amount of the emergency information to the vehicle service center 12. In the above, the minimum necessary amount of the emergency information is the positional information of the vehicle, the phone number of the cellular phone of the driver (also called a driver's cell-phone number), and an ID of the emergency notification in-vehicle terminal 9.

At S130, the emergency notification in-vehicle terminal 9 switches into a standby state with a low power consumption mode. When it is determined that the emergency notification in-vehicle terminal 9 is not using the electric power supplied from the back-up battery 29 but using the electric power supplied from the vehicle battery 28, the determination "NO" is made at S110. In this case, the process proceeds to S140. At S140, the emergency notification in-vehicle terminal 9 transmits a normal amount of the emergency information to the vehicle service center 12. The normal amount of the emergency information includes, in addition to the above-described minimum necessary amount of the emergency information, a data about the time of occurrence of the accident, a data about a vehicular swept path, a data about vehicle velocity and vehicle direction, and the like. After the S130, the process proceeds to S140 where the emergency notification in-vehicle terminal 9 switches into the standby state with the low power consumption mode.

Operations of the vehicle service center 12, which has an operator, will be described with reference to FIGS. 4 and 5. When the vehicle service center 12 has received the emergency information from the emergency notification in-vehicle terminal 9, the vehicle service center 12 performs a control operation illustrated in FIG. 4. At S210, the vehicle service center 12 determines whether the received emergency information contains the phone number of the cellular phone of the driver. When it is determined that the received emergency information contains the phone number of the cellular phone of the driver, corresponding to "YES" at S210, the process proceeds to S220. At S220, the vehicle service center 12 causes the operator to call back the phone number of the cellular phone and conduct a telephone communication with the driver of the vehicle. In this case, since the emergency notification in-vehicle terminal 9 is not using its telephone function, the electric power of both of the back-up battery 29 and the vehicle battery 28 is not used for the telephone communication between the operator and the driver. Therefore, it is possible to save the electric power.

When the vehicle service center 12 determines that the received emergency information does not contain the phone number of the cellular phone of the driver, corresponding to "NO" at S210, the process proceeds to S230. At A230, the vehicle service center 12 determines whether the vehicle service center 12 has a specific phone number that is pre-registered in the emergency notification in-vehicle terminal 9. In the above, the specific pre-registered phone number is one that is also pre-registered in the vehicle service center 12 and that is retrievable based on the ID of the emergency notification in-vehicle terminal 9. The specific pre-registered phone number may be, for example, a home telephone number of an owner of the vehicle, a phone number of a cellular phone of the owner of the vehicle, and the like. When the vehicle service center 12 determines that the vehicle service center 12 has the specific pre-registered phone number, corresponding to "YES" at S230, the process proceeds to S240. At S240, the vehicle service center 12 causes the operator to call back the specific pre-registered phone number and conduct a telephone communication with a person (e.g., the owner of the vehicle) who answers the call. In this case, since the emergency notification in-vehicle terminal 9 is not using its telephone function, the electric power of the back-up battery 29 and the vehicle battery 28 is not used. Therefore, it is possible to save the electric power.

When the vehicle service center 12 determines that the vehicle service center 12 does not has the specific pre-registered phone number, corresponding to "NO" at S230, the process proceeds to S250. At S250, the vehicle service center 12 causes the operator to directly calls back (the phone number of) the emergency notification in-vehicle terminal 9 and conduct a telephone communication with the driver.

Now, with reference to FIG. 5, explanation will be given on a case where the operator calls back the phone number of the cellular phone of the driver, and then, an abnormality such as a link disconnection and the like occurs during the telephone communication between the operator of the vehicle service center 12 and the driver of the vehicle. As shown in FIG. 5, at S310, the vehicle service center 12 determines whether an abnormality such as a link disconnection and the like has occurred during the telephone communication with the driver. When the vehicle service center 12 determines that an abnormality such as a disconnection and the like has not occurred during the telephone communication, corresponding to "NO" at S310, the process proceeds to S320. At S320, the operator of the vehicle service center 12 keeps conducting the telephone communication with the driver until the completion of the telephone communication.

When the vehicle service center 12 determines that an abnormality such as a link disconnection and the like has occurred during the telephone communication, corresponding to "YES" at S310, the process proceeds to S330. At S330, the vehicle service center 12 determines whether the vehicle service center 12 has the specific phone number pre-registered in the emergency notification in-vehicle terminal 9. When the vehicle service center 12 has the specific pre-registered phone number, corresponding to "YES" at S330, the process proceeds to S340. At S340, the operator of the vehicle service center 12 calls back the specific pre-registered phone number to conduct a telephone communication with a person who answers the call. Then, the process proceeds to S350. At S350, the vehicle service center 12 determines whether the vehicle service center 12 can have the telephone communication. When it is determined that the vehicle service center 12 can have the telephone communication, corresponding to "YES" at S350, the process proceeds to S320 where the vehicle service center 12 keeps conducting the telephone communication until completion of the telephone communication.

When it is determined at S330 that the vehicle service center 12 does not have the specific pre-registered phone number, corresponding to "NO" at S330, the process proceeds to S360. At S360, the operator of the vehicle service center 12 directly calls back the phone number of the emergency notification in-vehicle terminal 9 to conduct a telephone communication with the driver. When it is determined at S350 that the vehicle service center 12 cannot have the telephone communication, corresponding to "NO" at S350, the process also proceeds to S360 where the operator of the vehicle service center 12 directly calls back the phone number of the emergency notification in-vehicle terminal 9 to conduct a telephone communication with the driver.

Figure 6:
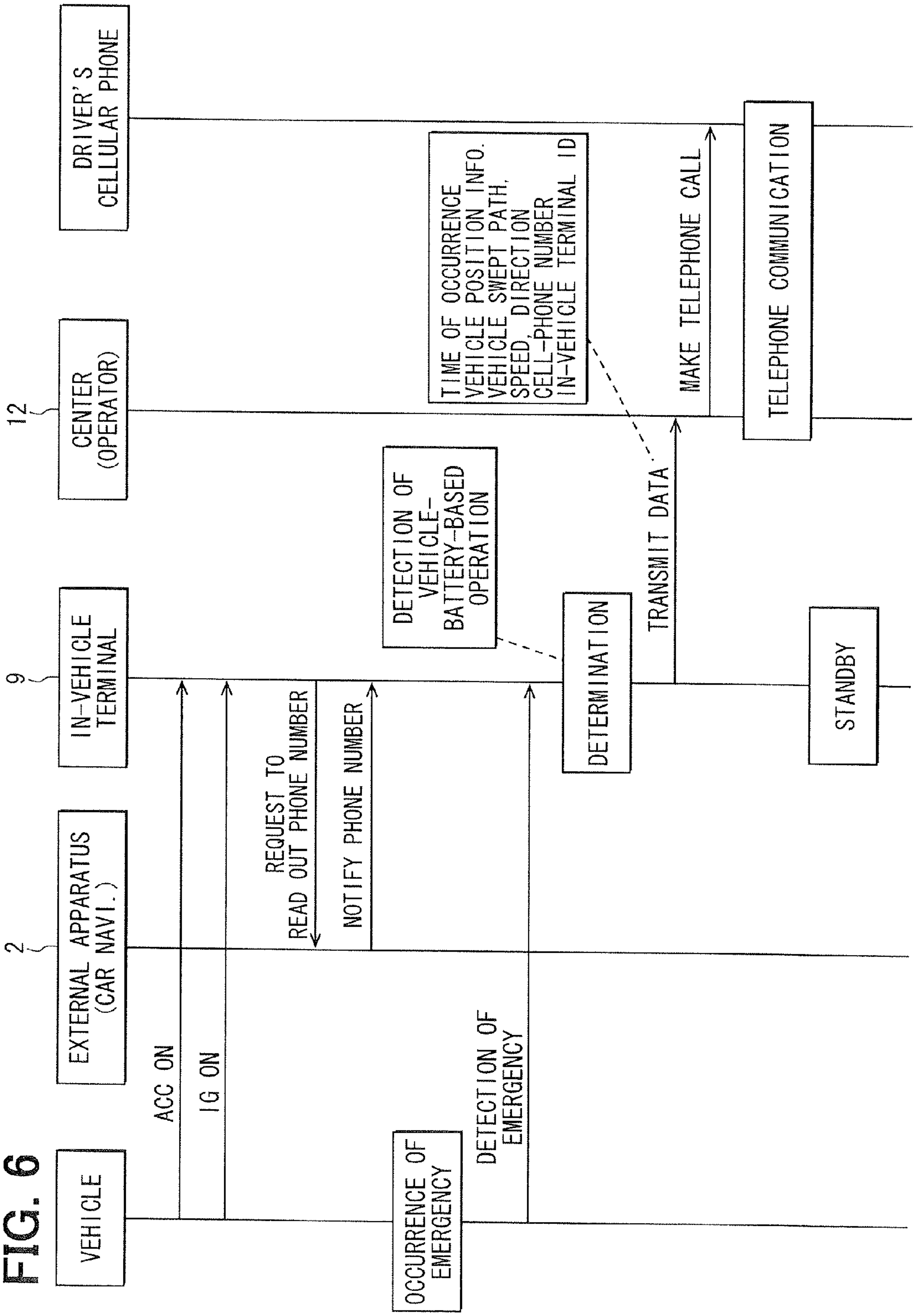
FIG. 6 is a diagram illustrating an operation of a system when an emergency notification in-vehicle terminal is operating by an electric power of a vehicle battery.

Next, with reference to FIG. 6, explanation will be given on how each of the emergency notification in-vehicle terminal 9, the operator of the vehicle service center 12, the vehicle, and the car navigation apparatus 2 sequentially operates when the emergency situation occurs and the emergency notification in-vehicle terminal 9 operates by the electric power of the vehicle battery 28. When the power switch 8 of the vehicle is turned on, the ACC signal with an on state and the IG (ignition) signal with an on state are inputted to the emergency notification in-vehicle terminal 9. Then, the emergency notification in-vehicle terminal 9 requests the car navigation apparatus 2 to read out the phone number of the cellular phone of the driver. The car navigation apparatus 2 wirelessly communicates with the cellular phone of the driver (which is carried into the vehicle compartment) by, for example, a Bluetooth connection, and reads out the phone number of the cellular phone, and transmits the read-out phone number of the cellular phone to the emergency notification in-vehicle terminal 9. The emergency notification in-vehicle terminal 9 records, in an internal memory thereof, the received phone number of the cellular phone of the driver.

Then, if the emergency situation such as a collision and the like occurs, the alarm apparatus 4 or the airbag ECU 6 transmits an emergency detection signal to the emergency notification in-vehicle terminal 9. Now, it is assumed that the emergency notification in-vehicle terminal 9 is using the electric power from the vehicle battery 28. In this case, since it is determined that the emergency notification in-vehicle terminal 9 is using the electric power from the vehicle battery 28, the emergency notification in-vehicle terminal 9 transmits the normal amount of the emergency information to the vehicle service center 12. The normal amount, which is an amount of emergency information to be transmitted under usual conditions, includes the positional information of the vehicle, the driver's cell-phone number, the ID of the emergency notification in-vehicle terminal 9, the time of the occurrence of the emergency situation (e.g., accident), a data about vehicle swept path, a data about vehicle velocity and direction, and the like.

Then, the vehicle service center 12 receives the emergency information from the emergency notification in-vehicle terminal 9. When the received emergency information contains the driver's cell-phone number, the operator calls back the driver's cell-phone number to conduct a telephone communication with the driver. If the received emergency information does not contain the driver's cell-phone number, the operator calls back (make a call) the specific phone number pre-registered in the emergency notification in-vehicle terminal 9 and conducts a telephone communication with a person who answers the call (e.g., an owner of the vehicle etc.). If the vehicle service center 12 does not have the specific pre-registered phone number, the operator directly calls back (make a call) the emergency notification in-vehicle terminal 9 and conducts a telephone communication with the driver.

Next, with reference to FIG. 7, explanation will be given on how each of the emergency notification in-vehicle terminal 9, the operator of the vehicle service center 12, the vehicle, the cellular phone of the driver, the vehicle and the car navigation apparatus 2 sequentially operates in the following case. The emergency situation occurs, and then, the wire connecting between the emergency notification in-vehicle terminal 9 and the vehicle battery 28 is disconnected for example; as a result, the emergency notification in-vehicle terminal 9 operates by the electric power of the back-up battery 29.

Figure 7:
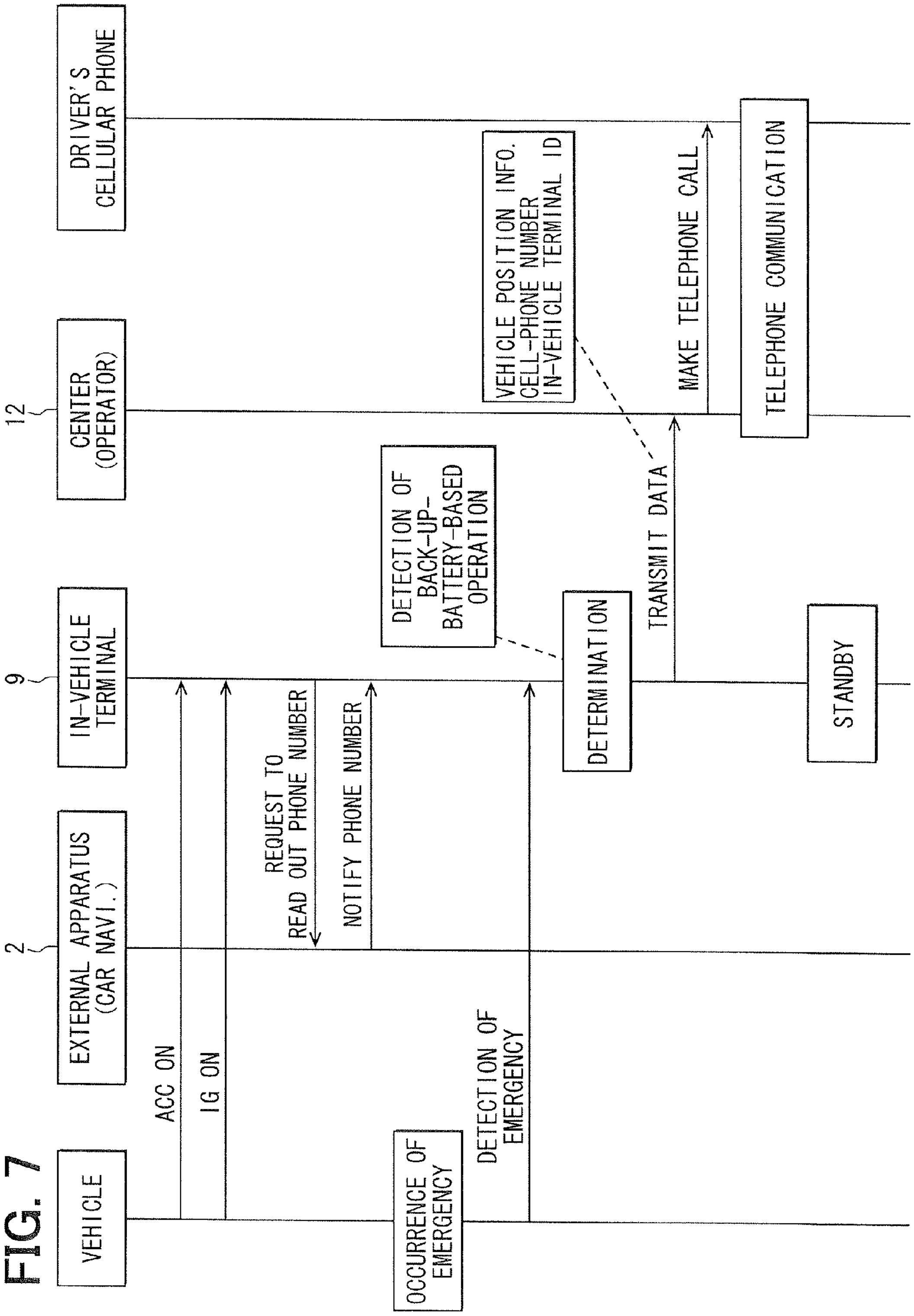
FIG. 7 is a diagram illustrating an operation of a system when an emergency notification in-vehicle terminal is operating by an electric power of a back-up battery.

As shown in FIG. 7, when the power switch 8 of the vehicle is turned on, the ACC signal with an on state and the IG (ignition) signal with an on state are inputted to the emergency notification in-vehicle terminal 9. Then, the emergency notification in-vehicle terminal 9 requests the car navigation apparatus 2 to read out the phone number of the cellular phone of the driver. The car navigation apparatus 2 wirelessly communicates with the cellular phone of the driver (which is carried into the vehicle compartment) by, for example, a Bluetooth connection, and reads out the phone number of the cellular phone, and transmits the read-out phone number of the cellular phone to the emergency notification in-vehicle terminal 9. The emergency notification in-vehicle terminal 9 records, in an internal memory thereof, the received phone number of the cellular phone of the driver.

Then, if the emergency situation such as a vehicle theft, a vehicle collision and the like occurs, the alarm apparatus 4 or the airbag ECU 6 transmits an emergency detection signal to the emergency notification in-vehicle terminal 9. Now, it is assumed that the emergency notification in-vehicle terminal 9 is powered by the electric power not from the vehicle battery 28 but from the back-up battery 29. In this case, since it is determined that the emergency notification in-vehicle terminal 9 is using the electric power from back-up battery 29, the emergency notification in-vehicle terminal 9 transmits the minimum necessary amount of the emergency information to the vehicle service center 12. In the above, the positional information of the vehicle, the driver's cell-phone number and the ID of the emergency notification in-vehicle terminal 9 are transmitted as the minimum necessary amount of the emergency information.

Then, the vehicle service center 12 receives the emergency information from the emergency notification in-vehicle terminal 9. When the received emergency information contains the driver's cell-phone number, the operator calls back (make a call) the driver's cell-phone number to conduct a telephone communication with the driver. If the received emergency information does not contain the driver's cell-phone number, the operator calls back (make a call) the specific phone number pre-registered in the emergency notification in-vehicle terminal 9 and conducts a telephone communication with a person who answers the call (e.g., an owner of the vehicle etc.). If the vehicle service center 12 does not have the specific pre-registered phone number, the operator directly calls back (make a call) the emergency notification in-vehicle terminal 9 and conducts a telephone communication with the driver.

According to the above-described present embodiment, if the emergency situation such as a vehicle collision and the like occurs, the emergency notification in-vehicle terminal 9 transmits the emergency information to the vehicle service center, and the operator of the service center 12 calls back. In the above, since the operator calls back the cellular phone of the driver, it is possible to decrease the power consumption of the emergency notification in-vehicle terminal 9. In particular, when the emergency notification in-vehicle terminal 9 operates by the electric power of the back-up battery 29 because of the disconnection of the wire to the vehicle battery 28, the decrease in power consumption of the emergency notification in-vehicle terminal 9 is noticeable. Because of the foregoing, a back-up battery having a smaller battery capacity can be used as the back-up battery 29 for the emergency notification in-vehicle terminal 9.

According to the present embodiment, if the emergency information transmitted from the emergency notification in-vehicle terminal 9 to the vehicle service center 12 does not contain the driver's cell-phone number, the operator of the vehicle service center 12 calls back a specific pre-registered phone number (which is pre-registered in the emergency notification in-vehicle terminal 9, and which may be a home phone number or a cell-phone number of an owner of the vehicle) and conducts a telephone communication with a person who answers the call (e.g., an owner of the vehicle). Therefore, it is possible to allow the emergency notification in-vehicle terminal 9 to consume a smaller electric power. As a result, it is possible to save the consumption of the electric power of the vehicle battery 28 and the back-up battery 29.

According to the present embodiment, if the emergency information transmitted from the emergency notification in-vehicle terminal 9 to the vehicle service center 12 does not contain the driver's cell-phone number, and if the vehicle service center 12 does not the have the specific pre-registered phone number, the operator of the vehicle service center 12 directly calls back the emergency notification in-vehicle terminal 9. Therefore, the vehicle service center 12 can reliably have the telephone communication with the driver.

According to the present embodiment, if it is determined that the emergency notification in-vehicle terminal 9 is using the electric power from the back-up battery 29 after the detection of the occurrence of the emergency situation, the emergency notification in-vehicle terminal 9 transmits the minimum necessary amount of the emergency information to the vehicle service center 12. Therefore, it is possible to allow the emergency notification in-vehicle terminal 9 to consume a smaller electric power. As a result, it is possible to save the consumption of the electric power of the vehicle battery 28 and the back-up battery 29.

The above embodiments can be modified in various ways, examples of which will be described below.

In the above embodiment, a Bluetooth connection function of the car navigation apparatus 2 is used to read out the driver's cell-phone number. Alternatively, a Bluetooth connection function of an in-vehicle apparatus other than the car navigation apparatus 2 may be used to read out the driver's cell-phone number. Alternatively, the emergency notification in-vehicle terminal 9 may be provided with a Bluetooth connection function. In this case, the emergency notification in-vehicle terminal 9 may directly communicate with the cellular phone of the drive via a Bluetooth connection and may read out the phone number of the cellular phone.

In the above embodiment, even when it is determined that the emergency notification in-vehicle terminal 9 is operating by the electric power of the vehicle battery 28, the vehicle service center 12 (the operator) calls back the phone number of the cellular phone of the driver to conduct a telephone communication with the driver or calls back the specific pre-registered phone number, which is pre-registered in the emergency notification in-vehicle terminal 9. Alternatively, only when it is determined that the emergency notification in-vehicle terminal 9 is operating by the electric power of the back-up battery 29, the vehicle service center 12 (the operator) may call back the phone number of the cellular phone of the driver to conduct a telephone communication with the driver or call back the specific pre-registered phone number. In other words, when it is determined that the emergency notification in-vehicle terminal 9 is operating by the electric power of the vehicle battery 28, the emergency notification in-vehicle terminal 9 may not transmit the driver's cell-phone number to the vehicle service center 12 as a component of the emergency information, so that the vehicle service center 12 (the operator) directly calls back the emergency notification in-vehicle terminal 9.

In the above embodiment, the specific pre-registered phone number, which is one previously registered in the emergency notification in-vehicle terminal 9, is also registered in the vehicle service center 12. Alternatively, the specific phone number pre-registered in the emergency notification in-vehicle terminal 9 may be incorporated in the minimum necessary amount of the emergency information, and the minimum necessary amount of the emergency information having the specific pre-registered phone number may be transmitted from the emergency notification in-vehicle terminal 9 to the vehicle service center 12.

In the above embodiments, a home phone number of an owner of the vehicle and a phone number of a cellular phone of the owner of the vehicle are shown as examples of the specific pre-registered phone number. Alternatively, a phone number of the emergency notification in-vehicle terminal 9 itself may be one example of the specific pre-registered phone number. The phone number of the emergency notification in-vehicle terminal 9 itself may be incorporated in the minimum necessary amount of the emergency information, and may be transmitted to the vehicle service center 12 as a component of the emergency information.

According to the present disclosure, there is provided an emergency notification in-vehicle terminal mountable to a vehicle and configured to transmit emergency information to a center in response to detection of an occurrence of an emergency situation involving the vehicle. The emergency notification in-vehicle terminal includes: a determination portion configured to determine, in response to the detection of the occurrence of the emergency situation, whether the emergency notification in-vehicle terminal is operating by an electric power of a back-up battery; and a transmission portion configured to transmit a minimum necessary amount of the emergency information to the center in cases where the determination portion determined that the emergency notification in-vehicle terminal is operating by the electric power of the back-up battery.

According to the above configuration, when the emergency notification in-vehicle terminal is operating by the electric power of the back-up battery, the emergency notification in-vehicle terminal transmits the minimum necessary amount of the emergency information to the center, and thus, it is possible to decrease amount of electric power consumption of the emergency notification in-vehicle terminal. Therefore, a small capacity battery can be used as the back-up battery.

The above emergency notification in-vehicle terminal may be configured in the following way. The above emergency notification in-vehicle terminal further includes a memory portion configured to store a driver's cell-phone number. The driver's cell-phone number is incorporated in the minimum necessary amount of the emergency information. According to this configuration, since an operator of the center can call back the driver's cell-phone number, it is possible to further decrease the amount of electric power consumption of the emergency notification in-vehicle terminal.

The above emergency notification in-vehicle terminal may be configured in the following way. The emergency notification in-vehicle terminal further includes a memory portion configured to store therein a phone number that is pre-registered in the emergency notification in-vehicle terminal and that is also pre-registered in the center. According to this configuration since an operator of the center can call back the pre-registered phone number if there is no driver's cell-phone number, it is possible to further decrease the amount of electric power consumption of the emergency notification in-vehicle terminal.

The above emergency notification in-vehicle terminal may be configured in the following way. The emergency notification in-vehicle terminal further includes a memory portion configured to store therein a phone number that is pre-registered in the emergency notification in-vehicle terminal. The pre-registered phone number is incorporated in the minimum necessary amount of the emergency information. According to this configuration, even if the phone number pre-registered in the emergency notification in-vehicle terminal is not pre-registered in the center, an operator of the center can call back the phone number pre-registered in the emergency notification in-vehicle terminal.

Additional advantages and modifications will readily occur to those skilled in the art. The invention in its broader terms is therefore not limited to the specific details, representative apparatus, and illustrative examples shown and described.

What is claimed is:

1. An emergency notification in-vehicle terminal mountable to a vehicle and configured to transmit emergency information to a vehicle service center in response to detection of an occurrence of an emergency situation involving the vehicle, the emergency notification in-vehicle terminal comprising:

a determination portion configured to determine, in response to the detection of the occurrence of the emergency situation, whether the emergency notification in-vehicle terminal is operating by an electric power of a back-up battery;

a transmission portion configured to transmit a minimum necessary amount of the emergency information to the vehicle service center when the determination portion determines that the emergency notification in-vehicle terminal is operating by the electric power of the back-up battery; and a memory portion configured to store a phone number, the phone number being incorporated into the minimum necessary amount of the emergency information, wherein;

the phone number is a cell-phone number, the transmission portion is further configured to transmit a predetermined data in addition to the minimum necessary amount of the emergency information to the vehicle service center in cases where the determination portion determines that the emergency notification in-vehicle terminal is operating not by the electric power of the back-up battery but by an electric power of a vehicle battery;

the back-up battery is a power source dedicated to the emergency notification in-vehicle terminal; and the vehicle battery is another power source common to parts of the vehicle.

2. An emergency notification in-vehicle terminal mountable to a vehicle and configured to transmit emergency information to a vehicle service center in response to detection of an occurrence of an emergency situation involving the vehicle, the emergency notification in-vehicle terminal comprising:

a determination portion configured to determine, in response to the detection of the occurrence of the emergency situation, whether the emergency notification in-vehicle terminal is operating by an electric power of a back-up battery;

a transmission portion configured to transmit a minimum necessary amount of the emergency information to the vehicle service center when the determination portion determines that the emergency notification in-vehicle terminal is operating by the electric power of the back-up battery; and a memory portion configured to store a phone number, the phone number being incorporated into the minimum necessary amount of the emergency information, wherein:

the phone number is a phone number that is pre-registered in the emergency notification in-vehicle terminal and that is also pre-registered in the vehicle service center, the transmission portion is further configured to transmit a predetermined data in addition to the minimum necessary amount of the emergency information to the vehicle service center in cases where the determination portion determines that the emergency notification in-vehicle terminal is operating not by the electric power of the hack-up battery but by an electric power of a vehicle battery;

the back-up battery is a power source dedicated to the emergency notification in-vehicle terminal; and the vehicle battery is another power source common to parts of the vehicle.

3. The emergency notification in-vehicle terminal according to claim 1, wherein the cell-phone number is associated with a driver's cell-phone that is inside the vehicle.

4. The emergency notification in-vehicle terminal according to claim 1, further comprising:

a processor acquiring the cell-phone number from a driver's cell-phone via an in-vehicle apparatus, when (i) the processor determines that the driver's cell-phone is connected by a Bluetooth connection with the in-vehicle apparatus and (ii) the processor determines that the cell-phone number is readable from the driver's cell-phone via the in-vehicle apparatus.

5. The emergency notification in-vehicle terminal according to claim 4, wherein the processor acquires the cell-phone number from the driver's cell-phone via the in-vehicle apparatus after the processor had previously determined that the cell-phone number was not readable from the driver's cell-phone, and waited for a predetermined time period before determining that the cell-phone number is readable from the driver's cell-phone via the in-vehicle apparatus.

6. An emergency notification system comprising:

an emergency notification in-vehicle terminal recited in claim 1; and the vehicle service center that, upon receipt of the emergency information from the emergency notification in-vehicle terminal, calls back the cell-phone number of the driver's cell-phone, wherein when the vehicle service center is connected to the driver by the call back to the cell-phone number of the driver's cell phone, but is then later disconnected, the vehicle service center calls a phone number of the emergency notification in-vehicle terminal or a phone number other than the cell-phone number of the driver's cell-phone.

7. An emergency notification system according to claim 6, wherein:

the phone number other than the cell-phone number of the driver's cell-phone is a number that is pre-registered in the emergency notification in-vehicle terminal and that is also pre-registered in the vehicle service center.

8. An emergency notification system according to claim 7, wherein:

when the vehicle service center is connected to the driver by the call back to the cell-phone number of the driver's cell phone, but is then later disconnected, the vehicle service center first calls back a number that is pre-registered in the emergency notification in-vehicle terminal and that is also pre-registered in the vehicle service center, and when connection with the number that is pre-registered in the emergency notification in-vehicle terminal and that is also pre-registered in the vehicle service center is not possible, the vehicle service center then calls the phone number of the emergency notification in-vehicle terminal.

9. An emergency notification system according to claim 7, wherein:

the number that is pre-registered in the emergency notification in-vehicle terminal and that is also pre-registered in the vehicle service center is a home telephone number of an owner of the vehicle.

* * * * *